July 4, 1967
F. G. NICCUM
3,329,269
FILTER
Filed Oct. 12, 1964
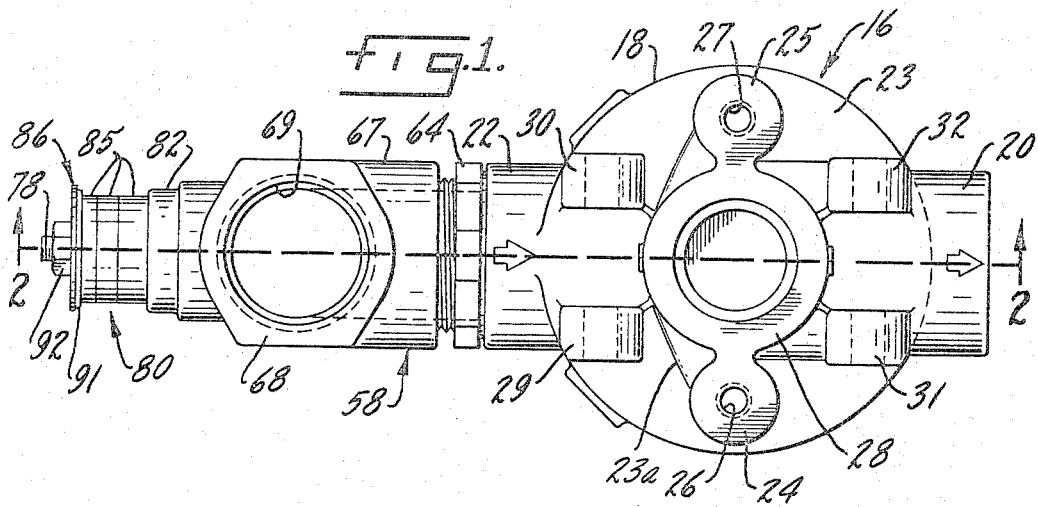
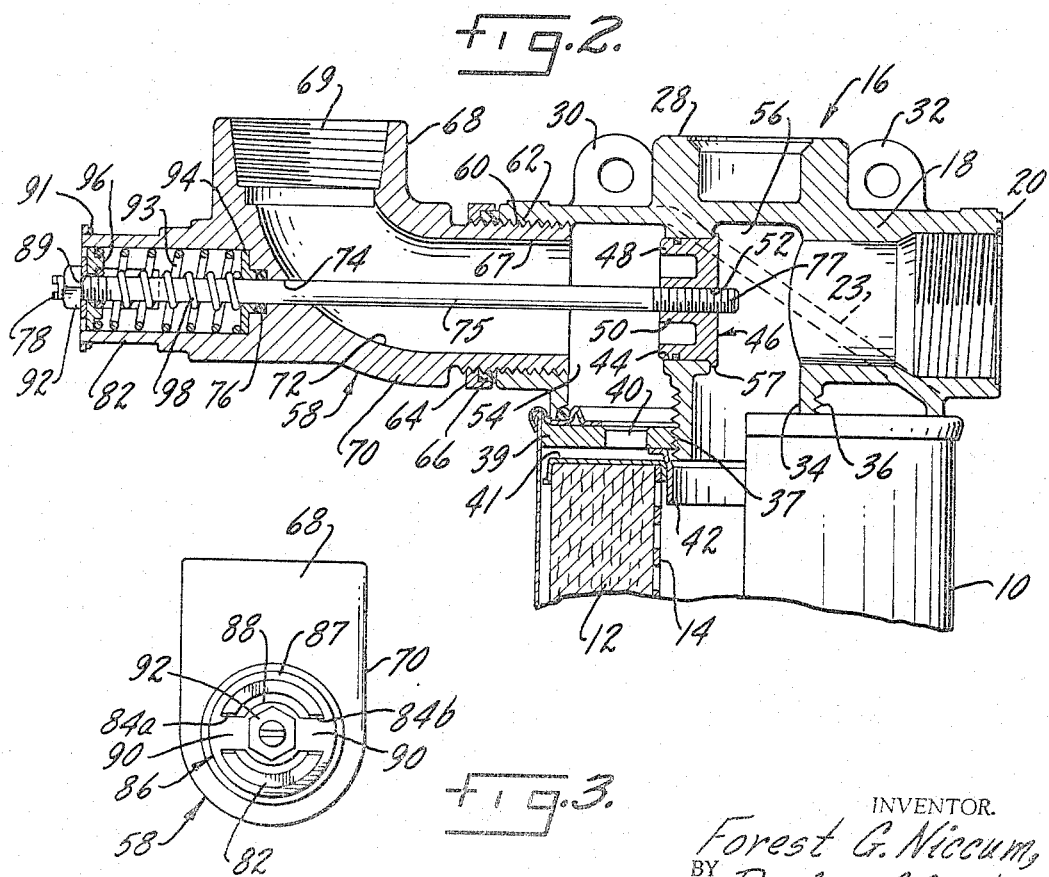
INVENTOR.
Forest G. Niccum,
BY Parker & Carter
Attorneys.

United States Patent Office 3,329,269
Patented July 4, 1967

3,329,269
FILTER
Forest G. Niccum, Wood Dale, Ill., assignor to Marvel Engineering Company, Chicago, Ill., a corporation of Illinois
Filed Oct. 12, 1964, Ser. No. 403,157
10 Claims. (Cl. 210—90)

This invention relates to filters and particularly relates to an offset inlet and external indicator assembly adapted for mounting on the filter and to operate in combination with such filter.

A primary object of this invention is a filter with a mountable offset inlet and external indicator which has versatile applications for different filtering operations.

Another object is a mountable offset inlet and external indicator assembly in combination with a filter so that the offset inlet may be advantageously disposed in places of limited accessibility.

Another object is a mountable offset inlet and external indicator which may be adjustably mounted to the inlet of a filter to accommodate particular filtering arrangements.

Another object is an offset inlet and external indicator in combination with a filter whereby the external indicator has a simplified indicating mechanism operable in response to the conditions within the filter.

Another object is a filter with a mountable offset inlet and external indicator in which the external indicator reports the position of the by-pass valve which controls the flow of fluid within the filter.

Another object is a filter with a mountable offset inlet and external indicator assembly which indicator reports a changed filtering condition within the filter to thereby permit, when desired, equipment shut down upon occurrence of such conditions.

Another object is a filter housing with a replaceable filter cartridge combined with an assembly including a removable and adjustable elbow inlet and external indicator which reports on the filtering condition of the cartridge within the filter housing.

Another object is an offset inlet and external indicator assembly which may be adjustably and removably mounted to a housing inlet of a filter.

Other objects will appear from time to time while considering the following specification and claims.

The invention is illustrated more or less diagrammatically in the accompanying drawings, wherein:

FIGURE 1 is a top plan view;
FIGURE 2 is a side elevational view partly in cross-section taken on line 2—2 of FIGURE 1; and
FIGURE 3 is an elevational front view of the offset inlet with external indicator.

The use of like numerals in the various views will indicate like elements, structures and concepts.

In the drawings a filter body 10 is shown only partly but such a filter body extends sufficiently to form a bottom container to receive a replaceable cylindrical filtering cartridge indicated at 12. The cartridge has a central core 14 which receives liquid filtered through the cartridge whereupon the filtered liquid moves out of the filter body into a filter head shown generally as 16.

The head includes a housing 18 having a housing outlet 20 and a housing inlet 22. The top of the head as illustrated has a rearwardly slanting portion 23 which starts its rearward slant from arcuate junction line 23a. This slanting portion is also shown by broken line in FIGURE 2. The head may be modified to include mounting bosses such as 24, 25 with threaded bores 26, 27 to receive screws. The mounting bosses 24, 25 are integral with a central boss 28 on top of the head through which a passage may be formed, if desired, to gain entry into the interior of the head. This may be done to mount a pressure gauge for example. Other mounting bosses with passageway may be provided, such as front bosses 29 and 30 formed integrally at the sides of housing inlet 22; and back bosses 31 and 32 formed integrally at the side of housing outlet 20.

Inside the head is shown a sleeve 34 which may be integrally formed with the head. The lower part of the sleeve is threaded as at 36 so that the head may be removably secured to the filter by threads 36 engaging threads 37 of cover plate 39. The filter assembly may be replaced by releasing the threadable engagement at 36 and 37. The plate 39 in the filter assembly has ports such as 40 through which fluid to be filtered passes, strikes cover 41, and then moves through the cartridge 12. An annular insert 42 is positioned in the core 14.

The sleeve 34 has an opening 44 to slidably receive by-pass valve 46. The valve is shown as having an outer annular rim 48 engaging the opening 44 and a central boss 50 having a threaded passageway 52. The valve is normally urged to a position which closes passageway 44 between chambers 54 and 56. The valve has a peripheral stop 57 which limits the closing movement of the urging means.

Mounted to the housing inlet 22 is an offset or elbow inlet 58. The offset inlet has threads 60 which engage threads 62 in the housing inlet. A lock nut 64 along with seal 66 may be used to lock the elbow inlet after elbow inlet 58 has been selectively rotated to a desired position for making a convenient connection to a fluid source. The lock nut 64 and seal 66 provide an anchoring rigidity for different positions of the elbow inlet, even though the threads 60 and 62 are not bottomed. The elbow inlet has an axial branch 67 and a lateral branch 68 with receiving port 69. The elbow inlet has a continuous side wall 70 forming said branches and defining a central passageway 72 through which fluid is transported to chamber 54, port 40 through cartridge 12, core 14 then up into chamber 56 of the head and out by way of the housing outlet 20.

A bore 74 is shown in the side wall of the lateral branch. An actuating rod 75 passes through this bore and extends out of the elbow inlet as shown. The rod is coaxial with the axial branch. An O-ring seal 76 may be provided to reduce leaks. The actuating rod has a threaded end 77 to engage the threaded passageway 52 in the valve, and an opposed threaded end 78 joined to an external indicator shown generally as 80. The indicator is shown here as having a housing 82 formed integrally with the side wall of the elbow inlet. The housing 82 is shown as an annular body with a plurality of slots such as 84a and 84b in the wall. The exterior of the housing has an indicator code shown at 85. The end 78 of the actuating rod is adjustably connected to an indicator shown generally by numeral 86. The indicator shown resembles somewhat a wheel. It has a rim 87, a hub 88 with opening 89 and spokes such as 90 connecting the hub to the rim, which spokes ride in the slots of the housing 82. An indicator ring 91, which may be a garter spring, is shown behind indicator 86. It will retain its last position around the housing so the extent of indicator travel may be recorded. The end 78 of the rod passes through opening 89 and is locked to the hub by nut 92. Within the housing is a housing spring 93 positioned with one final turn against a back disc 94 and the other final turn against end plug 96. A rod spring 98 is around the portion of the rod within the housing and its final turns are similarly positioned. Such springs urge the valve to the closed position. The indicator is repositioned when by-pass valve 46 is unseated against the urging of springs 92 and 98. The front plug 96 and indicator 86 will then travel to the right, and the degree of travel of said indicator will report to the observer how far the by-pass valve has become unseated within the head.

The use and operation of my invention are as follows:

Should an undesirable predetermined level of contamination be reached in the filter cartridge, the fluid to be filtered, being impeded from flowing through the cartridge element, will build up pressure in the chamber 54 sufficient to unseat the by-pass valve from its seat. With the valve unseated the fluid is free to by-pass the cartridge element and to flow outwardly through the housing outlet 20. When the by-pass valve moves off its seat, the rod moves inwardly of the housing and the indicator member 86 moves inwardly of the indicator housing against the action of the springs 92 and 98. The springs are effective to perform a double function of retaining the valve normally in its seat and controlling the action of the indicator member. As the indicator member is moved toward the elbow inlet, the rim 87 is moved along the outer surface of the housing to thereby align with reporting means or code 85, which may be suitable colored rings or stripes. For example, green stripes would be painted on the outer surface of the housing adjacent the outer end thereof, an adjacent stripe towards the housing could be yellow, and the remaining portion of the indicator housing could be painted red. Green would report normal filtering, yellow initial impedance and red absence of filtering. After spring 91 is repositioned it will report the fact of by-passing after the valve resets when the system shuts off.

The external indicator and elbow fitting assembly has been shown combined with a filter housing adapted to receive replaceable filter cartridges, particularly double wall cartridges having a central core. Such cartridges may be deposited in a housing attached to a removable head which has an outlet and inlet as shown. To this head the offset inlet may be attached as shown in FIGURE 1. From this embodiment the fluid to be filtered enters the inlet housing or the housing in the head, then passes into body 10 of the housing and is filtered through the double wall of the cartridge. It will be understood that the filter body and housing may take a variety of forms without departing from the nature or scope of this invention.

Particular versatility is obtained with the offset inlet and external indicator assembly which is mounted to the housing inlet and is preferably adjustably mounted so that the axial length of the offset inlet may be set, and the receiving port 69 may be radially positioned. Filters with such offset inlet bodies can be placed in areas of limited accessibility where the receiving port of the offset inlet is placed to receive the conduit or a line conveying the fluids to be filtered. The offset inlet additionally permits a receiving port to be positioned in the area of limited accessibility in a particular alignment with the conduit or line carrying the fluid to be filtered.

The offset inlet body has been shown as an elbow inlet having one branch aligned with the housing inlet and a lateral branch extending therefrom at a substantially right angle. The elbow inlet is adjustable both axially and radially by which is meant that the elbow inlet as a unit may be mounted closer or further from the filter and may be rotated so that the lateral branch may be positioned either up or down or sideways. It will be obvious that other branches could be provided for the offset inlet to accommodate particular space provisions, and this filter will be turned away from the branch which conveys the fluid in an axial line to the housing inlet.

It is an added advantage that when the elbow inlet 58 is radially repositioned, it is not necessary to separately reposition the rod 75, spring 92, 98 and external indicator 80. In other words, the valve, spring and housing all rotate together as the axial branch and the lateral branch are respectively longitudinally and radially positioned. The rod 75 in the passageway is coaxial with the axial branch and this permits unitary rotation which would otherwise be impeded if the rod were substantially askew. When the elbow inlet is axially repositioned, then rod 75 may be turned at end 78 to accordingly change its axial or longitudinal position.

The connection of rod 75 to the external indicator also permits the springs 92 to be out of the flow of the liquid to be filtered while still providing adequate force to normally urge the by-pass valve 46 to a closed position.

The foregoing invention can now be practiced and such practitioners will know that the invention is not necessarily restricted to the particular embodiments presented herein. The scope of the invention is to be defined by the terms of the following claims as given meaning by the preceding description.

I claim:

1. A filter including a housing, a housing inlet, a housing outlet, a filter cartridge in said housing communicating with said housing inlet and said housing outlet, an offset inlet attached to the housing inlet, the offset inlet having a body section, a passageway formed by the body section, a bore in the body section communicating with the passageway, a by-pass valve assembly within the filter, means urging said valve assembly towards a position closing the housing outlet against direct entry of fluid from said housing inlet, a rod-like element carried by said valve assembly and extending outwardly of the housing into the passageway of the offset inlet and through the bore, and an external indicator actuatingly engaged by said rod-like element to report the extent to which the valve becomes unseated.

2. A filter including a housing, a housing inlet, a housing outlet, a filter cartridge positioned in said housing and communicating with said housing inlet and said housing outlet, an adjustable offset inlet removably mounted to the housing inlet, the offset inlet having a body section with continuous side walls defining a passageway, a bore in the body section and communicating with the passageway, a valve in the filter, a housing inlet chamber on one side of the valve and a housing outlet chamber on the other side of the valve, said valve adapted to be unseated to communicate one chamber with the other chamber, yielding means urging said valve toward a position closing communication between said chambers, a rod-like element carried by said valve and extending outwardly of the housing into the passageway and through the bore in the side wall of the offset inlet, an external indicator positioned alongside the offset inlet, and said indicator actuatingly engaged by said rod-like element to report the extent to which the valve becomes unseated.

3. A filter including a housing, a housing inlet, a housing outlet, a filter cartridge positioned in said housing and communicating with the housing inlet and housing outlet, an elbow inlet adjustably and removably mounted to the housing inlet, the elbow inlet having one branch communicating with the housing inlet and another branch extending substantially normal to the first branch, the elbow inlet having a continuous side wall defining a passageway in both branches, a bore in the side wall of the laterally extending branch, a by-pass valve in the housing adapted to direct liquid past the cartridge and out of the housing when filtering capacity exceeds a predetermined level, yielding means urging said valve towards a position which directs fluid through the cartridge, a rod like element carried by the valve and extending outwardly from the housing into the elbow inlet and through the opening in the laterally extending branch of the elbow inlet, an external indicator positioned alongside the laterally extending branch of the elbow inlet, and said indicator actuatingly engaged by said rod-like element to report the extent to which the valve becomes unseated.

4. A filter including a housing, a housing inlet, a housing outlet, a filter cartridge positioned in said housing and communicating with the housing inlet, an elbow inlet mounted by adjustably securing means to permit axial and rotational positioning of the elbow inlet, the elbow inlet having a branch mounted to the housing inlet and a branch extending laterally therefrom, the elbow inlet having a continuous side wall defining a passageway in both branches, a bore in the side wall of the laterally extending branch generally aligned with the passageway in the branch mounted to the housing inlet, a by-pass valve in the housing, yielding means urging said valve toward a position which directs the fluid through the cartridge, a rod carried by the valve and extending outwardly of the housing into the passageway of the branch connected to the housing inlet and through the bore in the side wall, and an external indicator positioned alongside the laterally extending branch, and said external indicator actuatingly engaged by said rod to report the extent to which the valve becomes unseated.

5. A filter including a housing, a housing inlet, a housing outlet, a filter cartridge positioned in said housing and communicating with the housing inlet and housing outlet, an elbow inlet mounted on the housing inlet to permit longitudinal and radial adjustment of the elbow inlet, the elbow inlet having a branch mounted to the housing inlet and a branch extending laterally therefrom at a substantially right angle, the elbow inlet having a continuous side wall defining a passageway in both branches, a bore in the side wall of the laterally extending branch generally aligned with the passageway in the branch mounted to the housing inlet, a valve in the housing, yielding means urging said valve toward a position directing the fluid from the housing inlet to the cartridge, a rod carried by the valve and extending outwardly of the housing into the passageway of the branch connected to the housing inlet and through the bore in the side wall, an external indicator positioned alongside the laterally extending branch, an end member in the indicator, said end member connected to the rod, means to bias the end member against movement, and reporting means exposed by the end member when the valve moves to report the extent to which the valve becomes unseated.

6. A filter including a housing, a housing inlet, a housing outlet, a filter cartridge positioned in said housing and communicating with the housing inlet and housing outlet, and offset inlet mounted on the housing inlet, the offset inlet having a branch mounted to the housing inlet and a lateral branch extending therefrom, means for locking the housing inlet branch in a desired position, the offset inlet having a continuous side wall defining a passageway in both branches, a bore in the side wall of the lateral branch, a by-pass valve in the filter, means urging said valve towards a position closing the housing outlet against direct entry of fluid from said housing inlet, a rod-like element carried by the valve and extending outwardly of the housing into the passageway in the housing inlet branch and through the bore in the side wall, an external indicator actuatingly engaged by said rod-like element to report the extent to which the valve becomes unseated, and the housing inlet branch, the rod-like element and the external indicator being coaxial to facilitate rotational positioning of the offset inlet.

7. A filter including a housing, a housing inlet, a housing outlet, a filter cartridge positioned in said housing and communicating with the housing inlet and housing outlet, a rotatable offset inlet mounted on the housing, the offset inlet having a first branch mounted to the housing inlet and a lateral branch extending therefrom, a continuous passageway within the branches, a by-pass valve in the filter, means urging said valve towards a position closing the housing outlet against direct entry of fluid from said housing inlet, a rod-like element carried by the valve and extending outwardly of the housing into the passageway and then out of said first branch, an external indicator actuatingly engaged by said rod-like element, and the rod-like element aligned with the axis of the first branch so that the offset inlet may be rotated to a desired position without impedance.

8. A filter assembly including a filter body, a filter head for said body, an inlet in said head, an outlet in said head, a passage communicating said inlet and said outlet and by-passing said body, a valve positioned to open and close said passage, an elbow fitting rotatably positioned in said inlet, means for locking said fitting in said inlet at a variety of points therein, said fitting having a first passage portion coaxial with said inlet, and a second communicating passage portion angularly disposed with respect to said first passage portion, a rod secured to said valve and extending coaxially with and through said first passage portion and outwardly of said elbow fitting, yielding means engaging said fitting outwardly of said passage portion and engaging an outer end portion of said rod to urge said valve toward passage-closing position.

9. A filter including a housing, a housing inlet, a housing outlet, a filter cartridge positioned in said housing and communicating with the housing inlet and housing outlet, a rotatable offset inlet mounted on the housing, said offset inlet adjustable radially and longitudinally, the offset inlet having a first branch mounted to the housing inlet and a lateral branch extending therefrom, a continuous passageway within the branches, a by-pass valve in the filter, means urging said valve towards a position closing the housing outlet against direct entry of fluid from the housing inlet, an axially adjustable rod-like element carried by the valve and extending outwardly of the housing into the passageway and then out of said first branch, an external indicator actuatingly engaged by said rod-like element, and said rod-like element being accessible to adjust its axial length to accommodate changes in the longitudinal position of the offset inlet.

10. An offset inlet assembly to be connected to an inlet of a filter, said filter having a by-pass valve joined to a rod-like element and normally closing communication between an inlet and outlet of said filter, said offset assembly including a body section having a continuous side wall enclosing a passageway, a first branch of the body section, means on said first branch to adjustably mount the branch to the filter inlet in different radial and longitudinal positions, a bore in the side wall of the body section to slidably receive the rod-like element in coaxial relationship to the first branch, and an external indicator unit on the body section adapted to be rendered operative upon connection with the rod-like element to thereby report the extent to which the by-pass valve becomes unseated.

References Cited
UNITED STATES PATENTS

| | | | |
|---|---|---|---|
| 2,661,847 | 12/1953 | Buettner | 210—90 X |
| 3,080,972 | 3/1963 | Smith | 210—90 X |
| 3,164,164 | 1/1965 | Pall et al. | 210—130 X |

SAMIH N. ZAHARNA, Primary Examiner.